United States Patent
Vyas (10) Patent No.: US 11,151,971 B2
(45) Date of Patent: Oct. 19, 2021

(54) ACOUSTIC PANEL EMPLOYING CHOPPED FIBERS IN SEPTUM LAYER AND METHOD FOR MAKING SAME

(71) Applicant: SPIRIT AEROSYSTEMS, INC., Wichita, KS (US)

(72) Inventor: Amitabh Vyas, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 496 days.

(21) Appl. No.: 16/219,336

(22) Filed: Dec. 13, 2018

(65) Prior Publication Data

US 2019/0189102 A1 Jun. 20, 2019

Related U.S. Application Data

(60) Provisional application No. 62/598,627, filed on Dec. 14, 2017.

(51) Int. Cl.

| | |
|---|---|
| *G10K 11/00* | (2006.01) |
| *B32B 3/12* | (2006.01) |
| *B32B 7/12* | (2006.01) |
| *F02C 7/045* | (2006.01) |
| *G10K 11/175* | (2006.01) |
| *G10K 11/162* | (2006.01) |
| *G10K 11/172* | (2006.01) |

(52) U.S. Cl.
CPC .............. *G10K 11/002* (2013.01); *B32B 3/12* (2013.01); *B32B 7/12* (2013.01); *F02C 7/045* (2013.01); *G10K 11/162* (2013.01); *G10K 11/172* (2013.01); *G10K 11/175* (2013.01); *F05D 2250/283* (2013.01); *F05D 2300/614* (2013.01)

(58) Field of Classification Search
CPC .. G10K 11/002; G10K 11/162; G10K 11/172; G10K 11/175; B32B 3/12; B32B 7/12; F02C 7/045; F05D 2250/283; F05D 2300/614
See application file for complete search history.

(56) References Cited

U.S. PATENT DOCUMENTS

| | | | | |
|---|---|---|---|---|
| 3,952,831 | A * | 4/1976 | Bernard ................... | B32B 7/12 181/292 |
| 4,594,120 | A * | 6/1986 | Bourland, Jr. .......... | E04C 2/365 156/155 |
| 5,785,919 | A * | 7/1998 | Wilson ................ | B29D 24/005 264/401 |

(Continued)

*Primary Examiner* — Forrest M Phillips
(74) *Attorney, Agent, or Firm* — Hovey Williams LLP (57) ABSTRACT

An acoustic panel for attenuating sound and a method of making the acoustic panel. A septum structure is created comprising a layer of chopped fibers between layers of uncured epoxy. The structure is forced onto the open ends of the cells so that the edges of the cell walls cut the structure into pieces, with each piece having the same cross-sectional size and shape as one of the cells, and the pieces are pushed further into the cells to a specific position. The epoxy layers are cured, and holes are created in the cured epoxy layers to expose the chopped fibers and create septum layers within the cells. The chopped fibers may be sufficiently long and/or strong to provide structural support across each cell but sufficiently short and/or weak to be cut by the edge of the cell wall, and may melt at a higher temperature than the epoxy cures.

20 Claims, 5 Drawing Sheets

(56) References Cited

U.S. PATENT DOCUMENTS

| | | | | |
|---|---|---|---|---|
| 7,074,287 | B2* | 7/2006 | Belleguic | G10K 11/172 |
| | | | | 156/182 |
| 7,998,389 | B2* | 8/2011 | Burchett | B29D 99/0089 |
| | | | | 264/251 |
| 9,016,430 | B2* | 4/2015 | Ichihashi | G10K 11/172 |
| | | | | 181/292 |
| 9,587,582 | B1* | 3/2017 | Schaefer | F02K 1/72 |
| 9,676,148 | B2* | 6/2017 | Wadsworth | B29C 70/342 |
| 10,902,834 | B2* | 1/2021 | Thomas | F02K 1/827 |
| 2008/0171170 | A1* | 7/2008 | Fabreguette | B32B 37/146 |
| | | | | 428/40.1 |
| 2010/0062211 | A1* | 3/2010 | Kawazoe | C08G 59/504 |
| | | | | 428/116 |
| 2013/0171407 | A1* | 7/2013 | Franzoi | F02C 7/045 |
| | | | | 428/116 |

* cited by examiner

ACOUSTIC PANEL EMPLOYING CHOPPED FIBERS IN SEPTUM LAYER AND METHOD FOR MAKING SAME

RELATED APPLICATIONS

The present U.S. non-provisional patent application is related to and claims priority benefit of a prior-filed U.S. provisional patent application with the same title, Ser. No. 62/598,627, filed Dec. 14, 2017. The entire content of the identified prior-filed application is incorporated by reference in to the present application as if fully set forth herein.

FIELD

The present invention relates to acoustic panels and methods for making them, and more particularly, embodiments concern an acoustic panel employing chopped fibers in a septum layer and a method of making the acoustic panel.

BACKGROUND

It is often desirable to attenuate noise resulting from, e.g., the operation of aircraft engines. For example, an aircraft nacelle, which houses an aircraft engine, employs acoustic panels having a honeycomb core between a perforated first skin and a non-perforated second skin. The honeycomb core includes a plurality of cells functioning as Helmholtz resonator chambers for attenuating noise. The noise most attenuated is centered around a specific frequency which is determined by the dimensions of the honeycomb core cells, the perforated skin dimensions, and other factors. In order to attenuate noise over a wider frequency band, the honeycomb core cells are sometimes divided into multiple chambers by means of an acoustic resistance layer called a septum. This arrangement forms a double degree of freedom (DDOF) acoustic panel. The specific frequency range attenuated by the DDOF acoustic panel is determined by the dimensions of each chamber, which is determined by a position of septum layer in each cell.

It is desirable to use a septum layer having small holes, tortuous paths, and good entrance and exit conditions which provide smooth flow geometries in both directions. Certain woven meshes, such as reverse Dutch weave fabric, are often used in the septum layer. However, working with such a fabric, including mechanically cutting pieces to fit into each cell and then inserting and accurately positioning the pieces, can be time-consuming.

This background discussion is intended to provide information related to the present invention which is not necessarily prior art.

SUMMARY

Embodiments of the present invention address the above-described and other problems by providing an acoustic panel employing chopped fibers in a septum layer and a method of making the acoustic panel.

In one embodiment of the present invention, a method is provided for making an acoustic panel having a septum layer for attenuating sound. The acoustic panel may include a plurality of cells, with each cell including a cell wall having an edge at an open end of the cell. The method may include the following. A septum structure may be created comprising a chopped fiber layer including a plurality of chopped fibers, and at least one uncured epoxy layer. Portions of the at least one uncured epoxy layer may or may not be removed (e.g., holes may be drilled, pierced, burned, punched, cut, or otherwise created) to expose the chopped fibers of the chopped fiber layer. The septum structure may be forced onto the open ends of the plurality of cells so that the edges of the cell walls cut the septum structure into a plurality of individual pieces, with each individual piece having the same cross-sectional size and cross-sectional shape as one of the cells. The at least one uncured epoxy layer may be cured within the cells to form at least one cured epoxy layer.

Various implementations of the above-described embodiment may include any one or more of the following features. The chopped fibers may be randomly, semi-randomly, or non-randomly arranged in the chopped fiber layer. The chopped fibers may provide structural support across each cell and may be cut by the edges of the cell walls. The chopped fiber layer may be weakened along lines which correspond to the cross-sectional shape of each cell so as to facilitate the edges of the cell walls cutting the septum structure into the plurality of individual pieces. A cure temperature of the epoxy layer may be lower than a melting temperature of the chopped fibers. The method may further include pushing the individual pieces further into the cells to a specific position within the cells for attenuating a specific frequency or range of frequencies of sound. Portions of the at least one uncured epoxy layer may be removed to expose the chopped fibers of the chopped fiber layer.

The method may further comprise removing portions of the at least one cured epoxy layer to expose the chopped fibers of the chopped fiber layer, thereby forming the septum layer in each cell of the acoustic panel. If portions were removed from the uncured epoxy layer to expose the chopped fibers, then following curing, the removed portions may be re-shaped (e.g., re-drilled, re-pierced, re-burned, re-punched, re-cut, or otherwise re-created) as needed to account for the epoxy flowing during the curing process and changing the original shape (e.g., reducing or covering) of the removed portions. Removing portions of the cured epoxy layer may include creating a plurality of spaced apart holes in the at least one cured epoxy layer using a laser, a rotating cutter, or an electrode. The septum layer may have a first uncured epoxy layer and a second uncured epoxy layer, and the chopped fiber layer may be located between the first and second uncured epoxy layers. Removing portions of the first and second cured epoxy layers may include creating a plurality of spaced apart holes in the first and second cured epoxy layers using a laser, a rotating cutter, or an electrode.

In another embodiment of the present invention, a method is provided for making an acoustic panel having a septum layer for attenuating sound. The acoustic panel may include a plurality of cells, with each cell including a cell wall having an edge at an open end of the cell. The method may include the following. A septum structure may be created comprising a chopped fiber layer including a plurality of chopped fibers, wherein the chopped fibers may provide structural support across each cell and may be cut by the edges of the cell walls, and at least one uncured epoxy layer. The septum structure may be forced onto the open ends of the plurality of cells so that the edges of the cell walls cut the septum structure into a plurality of individual pieces, with each individual piece having the same cross-sectional size and cross-sectional shape as one of the cells. The individual pieces may be pushed further into the cells to a specific position within the cells for attenuating a specific frequency or range of frequencies of sound. The at least one uncured epoxy layer may be cured within the cells to form at least one cured epoxy layer, wherein a cure temperature of the epoxy layer may be lower than a melting temperature of the chopped fibers. A plurality of spaced apart holes may be created in the at least one cured epoxy layer to expose the chopped fibers of the chopped fiber layer, thereby forming the septum layer in each cell of the acoustic panel.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

Figure 1A:
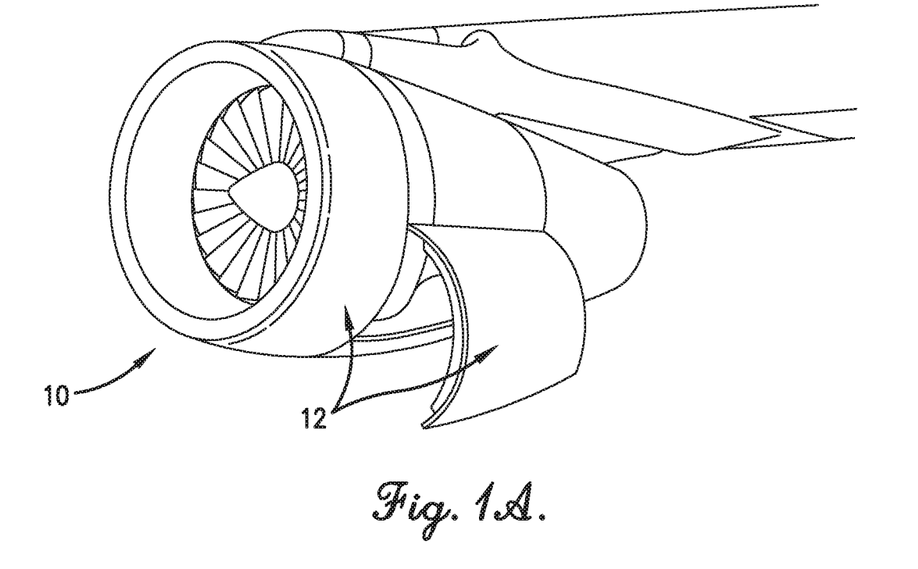
FIG. 1A is a fragmentary perspective view of an example structure (i.e., an engine nacelle of an aircraft) employing an acoustic panel.
Figure 1B:
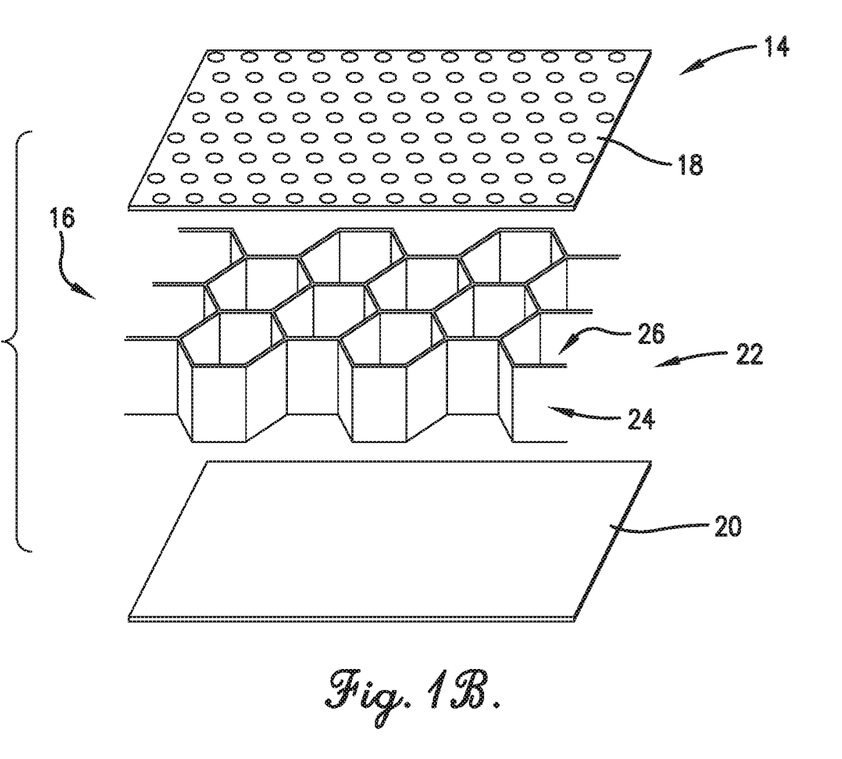
FIG. 1B is an exploded fragmentary isometric view of an example acoustic panel.
Figure 2:
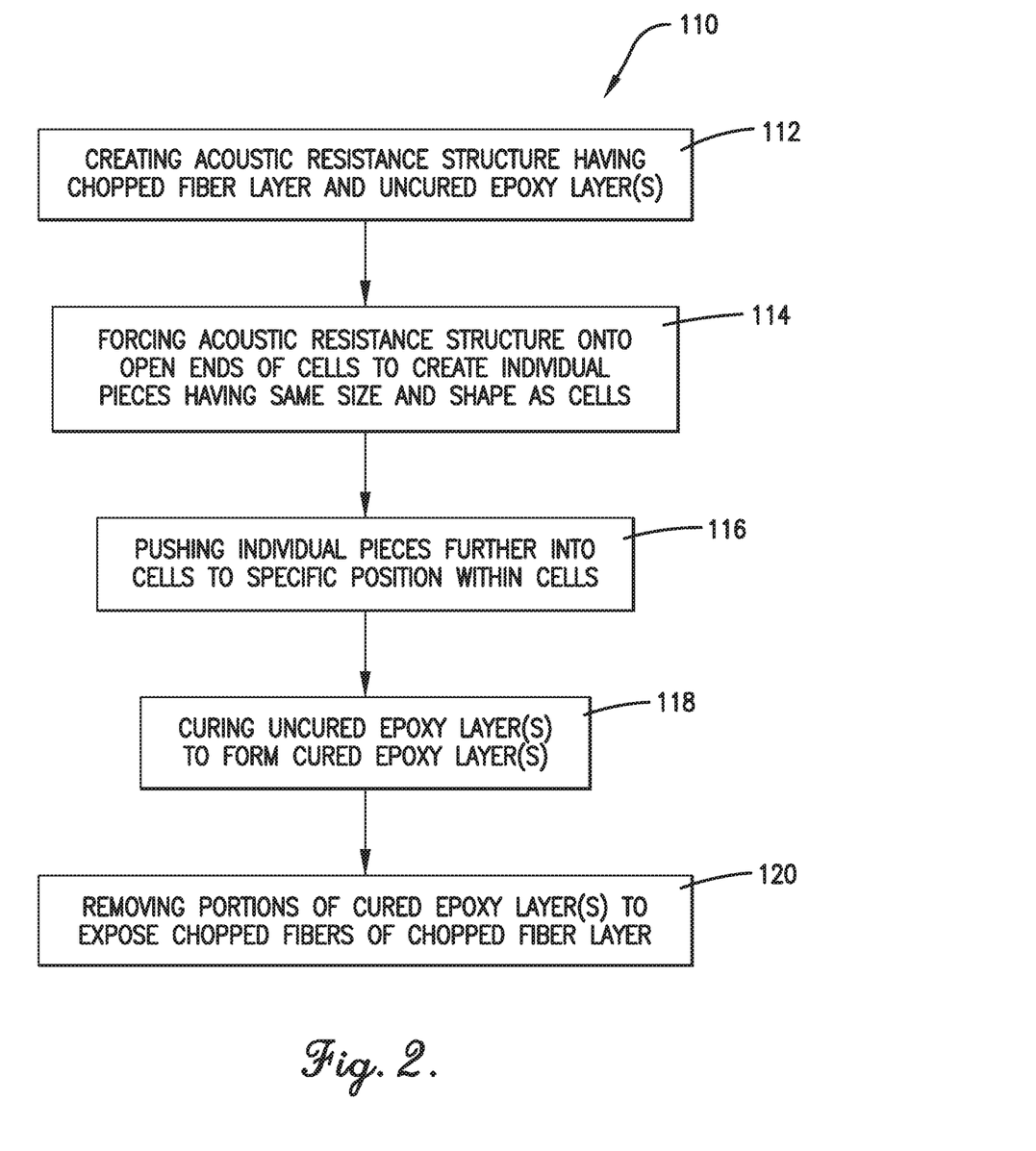
FIG. 2 is a flowchart of steps involved in an embodiment of a method of making the acoustic panel of FIG. 1B.

Referring to FIGS. 1A and 1B, a structure 10, in this case an example engine nacelle of an aircraft, may incorporate acoustic panels 12 to attenuate sound. An example acoustic panel 12 may include a core 16 interposed between a perforated inner skin 18 and a non-perforated outer skin 20.

The core 16 may include a plurality of cells 22 functioning as Helmholtz resonator chambers to attenuate a specific frequency or range of frequencies of sound. Each cell may have a cell wall 24 extending between open ends, with the cell wall ending 24 in an edge 26 at each open end. The specific frequency or range of frequencies is determined by the dimensions of each chamber, which is determined by a position of a septum layer in each cell 22.

Broadly characterized, the present invention concerns the acoustic panel 14 for attenuating sound by employing chopped fibers in a septum layer, and a method of making the acoustic panel 14. In one embodiment, shown in FIGS. 3-7, a septum structure 28 may be created having a layer 30 of chopped fibers between layers of uncured epoxy 32,34. Although the elements 32,34 are described herein as layers of uncured epoxy, and epoxy has been found to be suitable for manufacturing these layers, it is anticipated that other polymers may be substituted for epoxy. Thus, as used herein, the term "uncured epoxy" shall be understood to include other polymers known in the art, and having properties comparable to epoxy. The septum structure 28 may be pressed or otherwise forced onto the open ends of the cells 22 so that the edges 26 of the cell walls 24 cut the septum structure 28 into individual pieces 36, with each piece 36 having the same cross-sectional size and cross-sectional shape as one of the cells 22. The pieces 36 may be pushed or otherwise moved further into the cells 22 to a specific position for attenuating a specific frequency or range of frequencies. The uncured epoxy layers 32,34 may be cured within the cells to form cured epoxy layers 32,34. Holes 38 may be created in the cured epoxy layers 32,34 to expose the chopped fibers, thereby forming the septum layer 40 in each cell 22.

In one implementation, the uncured epoxy layers 32,34 may be epoxy film. The holes 38 may be pre-drilled or otherwise created (e.g., pierced, burned, punched, or cut) in the uncured epoxy film, and to the extent the curing process causes the epoxy to flow and the pre-drilled holes 38 to alter their shape, the holes 38 may be re-drilled or otherwise re-shaped (e.g., re-pierced, re-burned, re-punched, or re-cut) following curing.

The chopped fibers may be randomly, semi-randomly, or non-randomly arranged in the chopped fiber layer 30. The chopped fibers may be sufficiently long and/or strong to provide structural support for the septum as it spans across each cell 22 and/or sufficiently long to allow the fibers to span entirely across the holes 38 where they are unconstrained by the epoxy layers 32,34, but sufficiently short and/or weak to be cut by the edges of the cell walls 26. In one implementation, the chopped fiber layer 30 may be pre-processed to facilitate separation and insertion into the cells 22. For example, the chopped fiber layer 30 may be scored, slit, perforated, or otherwise weakened along lines which correspond to the shapes of the cells 22 so as to facilitate the edges of the cell walls 26 cutting the chopped fiber layer 30 into individual pieces which correspond to the shapes of the cells 22. In one implementation, a plurality of chopped fiber layers may be used to reduce the open areas of the layers, or more chopped fibers may be concentrated in certain areas to accomplish the same function. The cure temperature of the epoxy may be lower than the melt temperature of chopped fibers. In an alternative implementation, the septum structure may have only one epoxy layer. In alternative implementations, there may be a single septum layer at a specific position in each cell, or there may be multiple septum layers at different specific positions in each cell.

Figure 3:
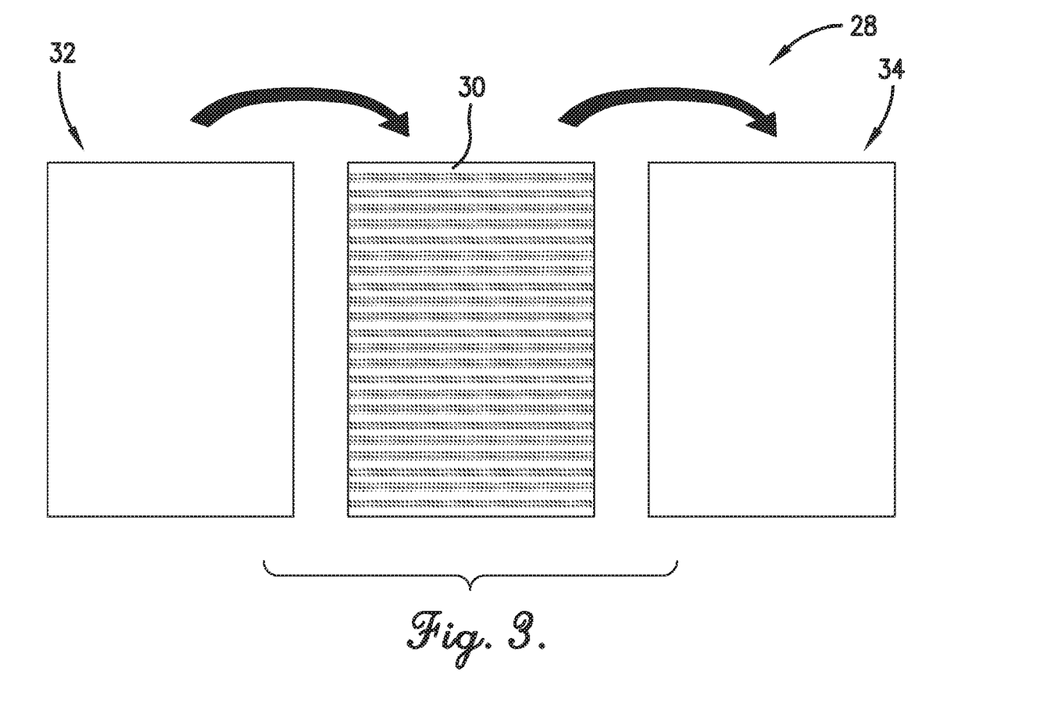
FIG. 3 is an exploded view of a multi-layered septum structure.

Referring to FIGS. 2-7, an embodiment of a method 110 is shown for making an acoustic panel 14 for attenuating sound by employing chopped fibers in a septum layer 40. As described above, the acoustic panel 14 may include the plurality of cells 22, with each cell 22 having the cell wall 26 and an open end. The method 110 may include the following. A septum structure 28 may be created having a chopped fiber layer 30 including a plurality of chopped fibers, and at least one uncured epoxy layer 32, as shown in 112. The uncured epoxy layer 32 may take the form of a semi-solid film. As illustrated in FIG. 3, in one implementation the septum structure 28 may include first and second uncured epoxy layers 32,34, with the chopped fiber layer 30 being located therebetween.

Figure 4:
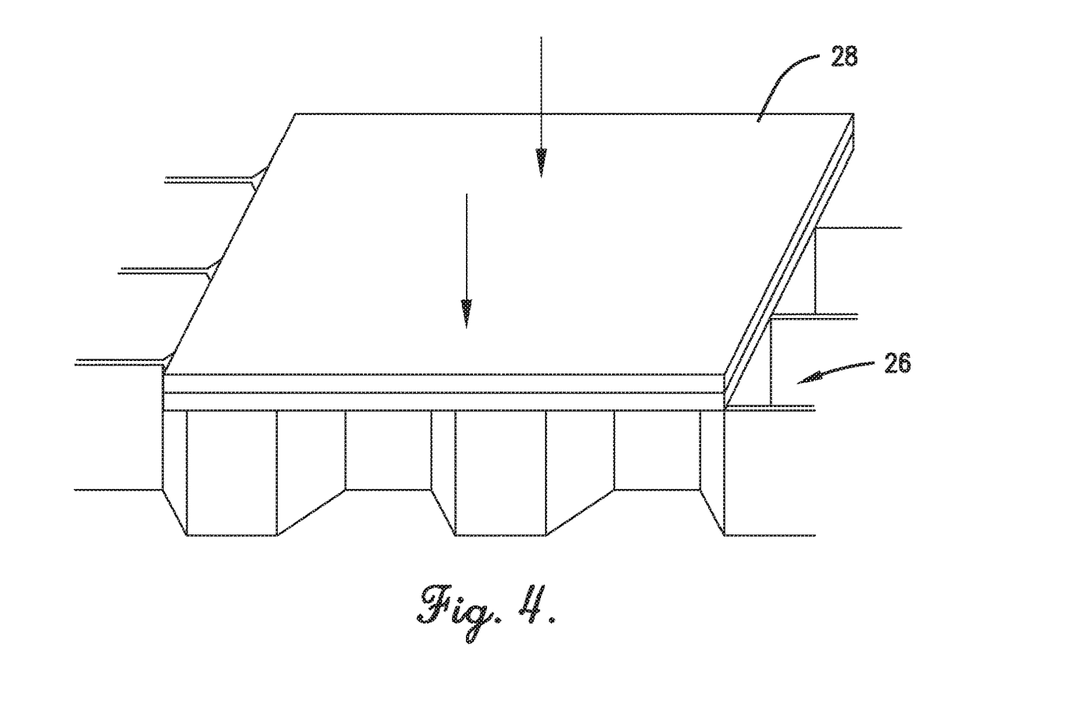
FIG. 4 is an isometric view of the septum structure of FIG. 3 being forced onto a plurality of cells.
Figure 5:
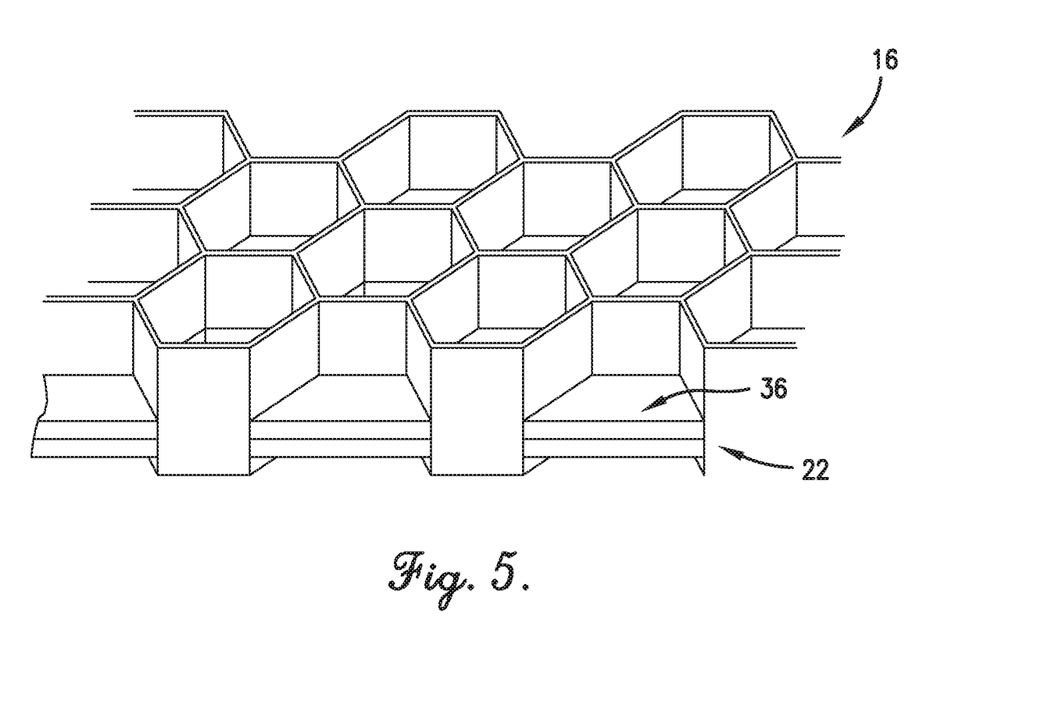
FIG. 5 is an isometric view of a septum layer positioned in each cell.
Figure 6:
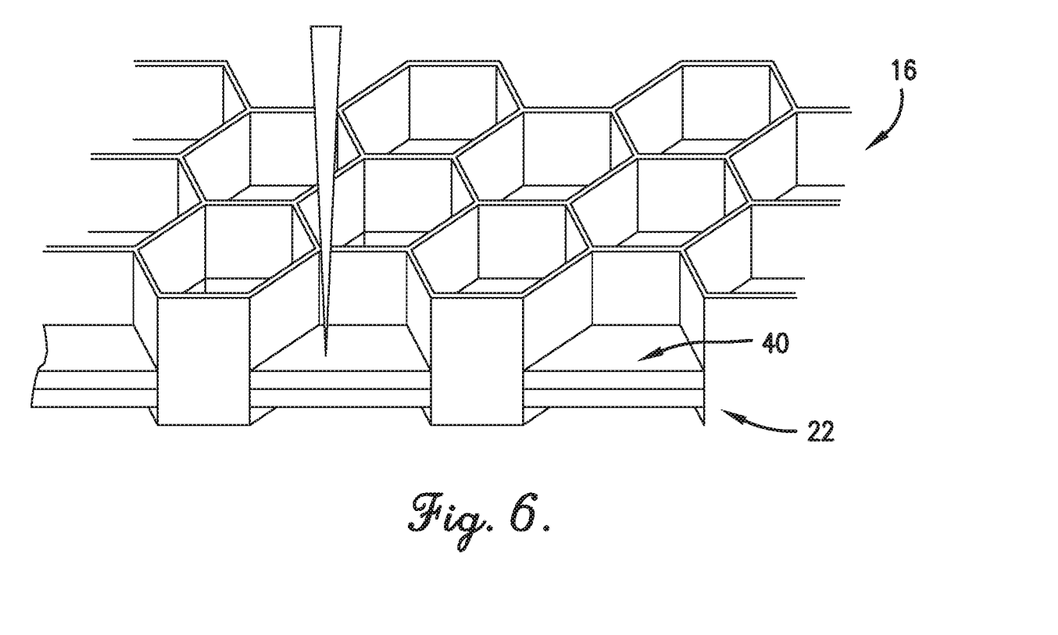
FIG. 6 is an isometric view of the septum layer in each cell, with a mechanism shown removing a portion of a cured epoxy layer to expose a chopped fiber layer.
Figure 7:
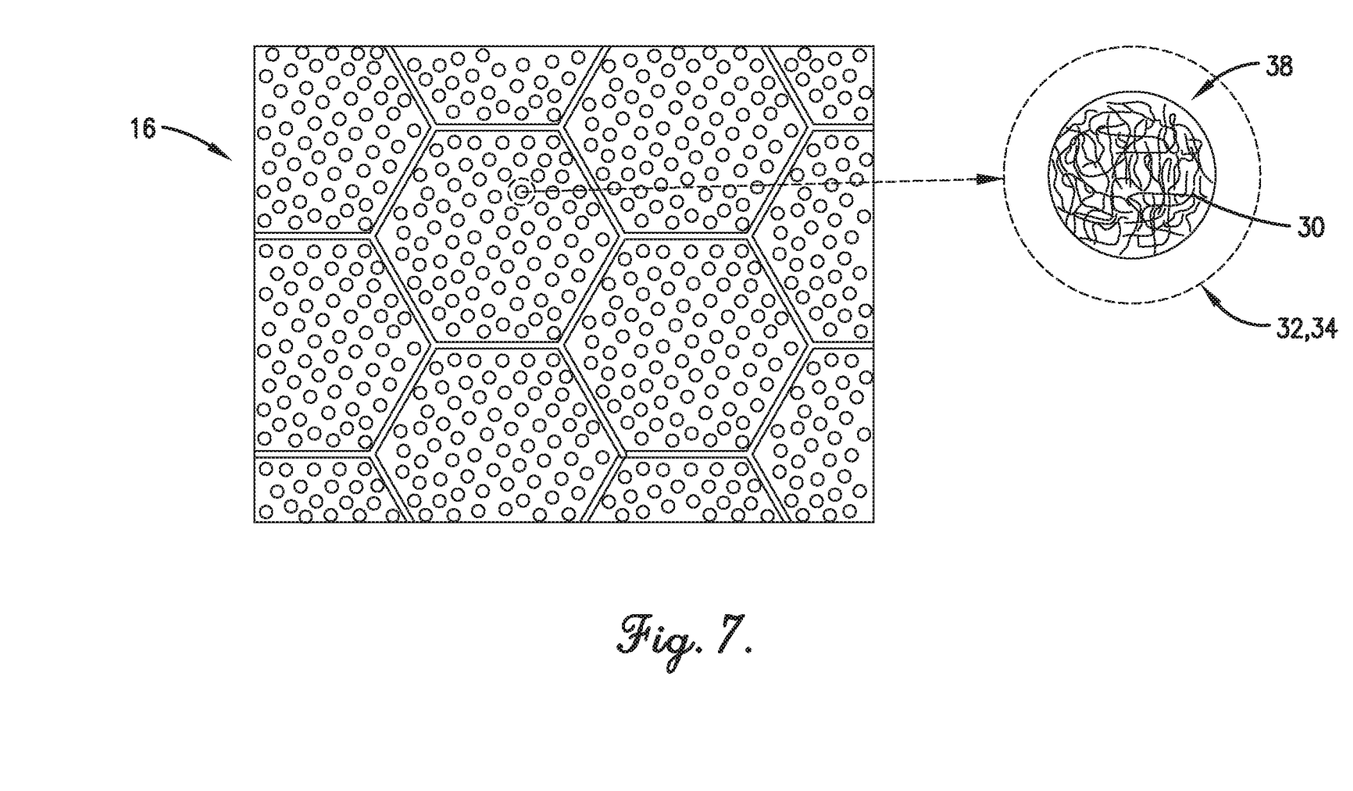
FIG. 7 is a plan view of the resulting septum layer in each cell, with a magnified area showing a removed portion of the cured epoxy layer and the exposed chopped fiber layer.

The septum structure 28 may be pressed or otherwise forced onto the open ends of the plurality of cells 22 so that the edges 26 of the cell walls 24 cut the septum structure 28 into a plurality of individual pieces 36, with each individual piece 36 having approximately the same cross-sectional size and cross-sectional shape as one of the cells 22, as shown in 114 and illustrated in FIG. 4. The individual pieces 36 may be pushed or otherwise moved further into the cells 22 to a specific position within the cells 22 to attenuate a specific frequency or range of frequencies of sound, as shown in 116 and illustrated in FIG. 5.

The uncured epoxy layer(s) 32 may be cured within the cells 22 to form a cured epoxy layer(s) 32, as shown in 118. Portions of the cured epoxy layer(s) may be removed to expose the chopped fibers of the chopped fiber layer 30, thereby forming the septum layer 40 in each cell 22 of the acoustic panel 14, as shown in 120 and illustrated in FIGS. 6 and 7. More specifically, once the epoxy layer(s) 32 have been cured, portions thereof may be removed, such as by creating (e.g., piercing, burning, cutting, drilling, punching) a plurality of spaces apart holes 38 therethrough, using a high energy source such as a laser, rotating cutter, or electrical spark to expose the chopped fiber layer 30. When a laser is used, the laser may be tuned to create holes in the epoxy layer(s) but not in the chopped fiber layer. In an alternative embodiment, the step of removing portions of (e.g., creating holes in) the epoxy layer(s) may be performed on the uncured epoxy layer(s) of the septum structure. In such an embodiment, the preexisting holes in each epoxy layer 32,34 may be aligned when assembled together with the chopped fiber veil 30. The preexisting holes may need to be re-drilled or otherwise re-shaped following curing.

Although described herein in the context of an acoustic panel for an engine nacelle, embodiments of the present invention may be adapted to other contexts, such as other vehicles (e.g., cars, trucks, commercial trucks) and fixed structures (e.g., theaters, stadiums, concert halls).

Thus, it will be appreciated that embodiments of the present invention provide several advantages over the prior art, including allowing for accommodating variations in the size and/or shapes of the cells while allowing for making acoustic septums faster and less expensively than the prior art.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A method of making an acoustic panel having a septum layer for attenuating sound, the acoustic panel including a plurality of cells, with each cell including a cell wall having an edge at an open end of the cell, the method comprising:
creating a septum structure comprising—
a chopped fiber layer including a plurality of chopped fibers, and
at least one uncured epoxy layer;
forcing the septum structure onto the open ends of the plurality of cells so that the edges of the cell walls cut the septum structure into a plurality of individual pieces, with each individual piece having the same cross-sectional size and cross-sectional shape as one of the cells; and
curing the at least one uncured epoxy layer within the cells to form at least one cured epoxy layer.

2. The method of claim 1, wherein the chopped fibers are non-randomly arranged in the chopped fiber layer.

3. The method of claim 1, wherein the chopped fibers provide structural support across each cell and are cut by the edges of the cell walls.

4. The method of claim 1, wherein the chopped fiber layer is weakened along lines which correspond to the cross-sectional shape of each cell so as to facilitate the edges of the cell walls cutting the septum structure into the plurality of individual pieces.

5. The method of claim 1, wherein a cure temperature of the epoxy layer is lower than a melting temperature of the chopped fibers.

6. The method of claim 1, further comprising pushing the individual pieces further into the cells to a specific position within the cells for attenuating a specific frequency or range of frequencies of sound.

7. The method of claim 1, wherein portions of the at least one uncured epoxy layer are removed to expose the chopped fibers of the chopped fiber layer.

8. The method of claim 1, further comprising removing portions of the at least one cured epoxy layer to expose the chopped fibers of the chopped fiber layer, thereby forming the septum layer in each cell of the acoustic panel.

9. The method of claim 1, wherein removing portions of the at least one cured epoxy layer comprises creating a plurality of spaced apart holes in the at least one cured epoxy layer.

10. The method of claim 8, wherein the plurality of spaced apart holes are created by at least one of lasers, rotating cutters, and electrodes.

11. The method of claim 1, wherein the septum layer has a first uncured epoxy layer and a second uncured epoxy layer, and the chopped fiber layer is located between the first and second uncured epoxy layers.

12. The method of claim 10, wherein removing portions of the first and second cured epoxy layers includes creating a plurality of spaced apart holes in the first and second cured epoxy layers.

13. A method of making an acoustic panel having a septum layer for attenuating sound, the acoustic panel including a plurality of cells, with each cell including a cell wall having an edge at an open end of the cell, the method comprising:
creating a septum structure comprising—
a chopped fiber layer including a plurality of chopped fibers, and
at least one uncured epoxy layer, wherein portions of the at least one uncured epoxy layer are removed to expose the chopped fibers of the chopped fiber layer;
forcing the septum structure onto the open ends of the plurality of cells so that the edges of the cell walls cut the septum structure into a plurality of individual pieces, with each individual piece having the same cross-sectional size and cross-sectional shape as one of the cells;

pushing the individual pieces further into the cells to a specific position within the cells for attenuating a specific frequency or range of frequencies of sound; and curing the at least one uncured epoxy layer within the cells to form at least one cured epoxy layer, thereby forming the septum layer in each cell of the acoustic panel.

14. The method of claim 13, wherein the chopped fibers are non-randomly arranged in the chopped fiber layer.

15. The method of claim 13, wherein the chopped fibers provide structural support across each cell and are cut by the edges of the cell walls.

16. The method of claim 13, wherein the chopped fiber layer is weakened along lines which correspond to the cross-sectional shape of each cell so as to facilitate the edges of the cell walls cutting the septum structure into the plurality of individual pieces.

17. The method of claim 13, wherein a cure temperature of the epoxy layer is lower than a melting temperature of the chopped fibers.

18. The method of claim 13, following curing the at least one uncured epoxy layer, the method further including reshaping the removed portions to expose the chopped fibers of the chopped fiber layer.

19. The method of claim 18, wherein the removed portions are re-shaped by at least one of lasers, rotating cutters, and electrodes.

20. A method of making an acoustic panel having a septum layer for attenuating sound, the acoustic panel including a plurality of cells, with each cell including a cell wall having an edge at an open end of the cell, the method comprising:

creating a septum structure comprising—
a chopped fiber layer including a plurality of chopped fibers, wherein the chopped fibers provide structural support across each cell and are cut by the edges of the cell walls, and
at least one uncured epoxy layer;

forcing the septum structure onto the open ends of the plurality of cells so that the edges of the cell walls cut the septum structure into a plurality of individual pieces, with each individual piece having the same cross-sectional size and cross-sectional shape as one of the cells;

pushing the individual pieces further into the cells to a specific position within the cells for attenuating a specific frequency or range of frequencies of sound;

curing the at least one uncured epoxy layer within the cells to form at least one cured epoxy layer, wherein a cure temperature of the epoxy layer is lower than a melting temperature of the chopped fibers; and creating a plurality of spaced apart holes in the at least one cured epoxy layer to expose the chopped fibers of the chopped fiber layer, thereby forming the septum layer in each cell of the acoustic panel.

\* \* \* \* \*